US006305548B1

(12) United States Patent
Sato et al.

(10) Patent No.: US 6,305,548 B1
(45) Date of Patent: Oct. 23, 2001

(54) METHOD AND SYSTEM FOR RECYCLING DISCARDED INDUSTRIAL PRODUCTS

(75) Inventors: Eiji Sato, Ibaraki-ken; Masakatsu Hayashi, Ushiku; Takeo Takagi, Tsukuba; Toshiyuki Aoki, Ibaraki-ken; Yoshiyuki Takamura, Kudamatsu; Tsutomu Hasegawa, Niiza; Shigeki Kunii, Chiba, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/398,045

(22) Filed: Sep. 17, 1999

(30) Foreign Application Priority Data

Sep. 18, 1998 (JP) .................................................. 10-264309

(51) Int. Cl.[7] ...................................................... B07C 5/02
(52) U.S. Cl. .......................... 209/3.3; 209/583; 209/577; 209/576; 209/933; 209/705; 209/702; 209/630
(58) Field of Search ............................. 209/33, 630, 702, 209/705, 583, 742, 933

(56) References Cited

U.S. PATENT DOCUMENTS 5,436,843 * 7/1995 Kamejima et al. ............. 364/468.01

FOREIGN PATENT DOCUMENTS

95/28680 * 10/1995 (WO) .

* cited by examiner

Primary Examiner—Donald P. Walsh
Assistant Examiner—Jonathan R Miller
(74) Attorney, Agent, or Firm—Antonelli, Terry, Stout & Kraus, LLP

(57) ABSTRACT

A discarded industrial product recycling system capable of acquiring pertinent data required for processings of discarded industrial products such as discarders, reception dates, persons responsible for disposal, disposal dates and so forth for selecting proper disposal for each of the discarded industrial products while automatizing the article data acquisition to a possible maximum for enhancing the enhance disposal rate. An electronic tag (radio-frequency identifier tag) is attached to each of discarded industrial products to allow data required for the processing to be written and read by readers/writers. At a time point and a place where a discarded industrial product is received, basic data required for the processing of that article is written in the electronic tag. Pertinent processing route for each of the manufactured articles is decided by reading the data from the electronic tag while writing additional data in the tag as occasion requires. Properties of plastic material are measured, results of which are written in the electronic tag. Classification of component parts resulting from disassembling is carried out by affixing an electronic tag to each palette, reading the data from the electronic tag attached to the discarded industrial product and writing a code of assortment destination for the parts carried by the palette in the electronic tag affixed thereto on the basis of the data read from the electronic tag attached to the discarded industrial product.

14 Claims, 10 Drawing Sheets

FIG. 2

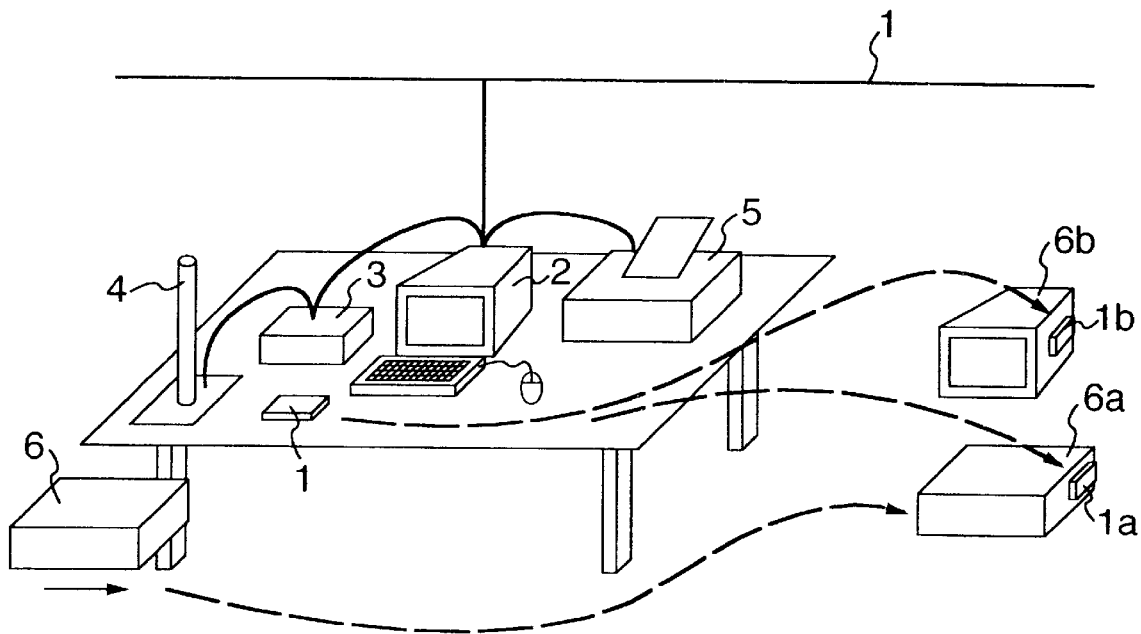

FIG. 3

DISCARDER NAME : ○○○
DISCARDER ADDRESS : ○○○
DISCARDER TELEPHONE NUMBER : ○○○
MANUFACTURER NAME : ○○○
ARTICLE NAME : ○○○
PRODUCT MODEL : ○○○
MANUFACTURE DATE : ○○○
WEIGHT : ○○○
RECEIVED DEALER NAME : ○○○
DATE OF RECEPTION AT DEALER : ○○○
DISPOSAL COST : ○○○
DATE OF DISPATCH FROM DEALER : ----
RECOVERY CENTER NAME : ----
DATE OF RECEPTION
  AT RECOVERY CENTER : ----
DATE OF DISPATCH
  FROM RECOVERY CENTER : ----
DISPOSAL CENTER NAME : ----
DATE OF RECEPTION
  AT DISPOSAL CENTER : ----
DATE OF DISPOSAL : ----

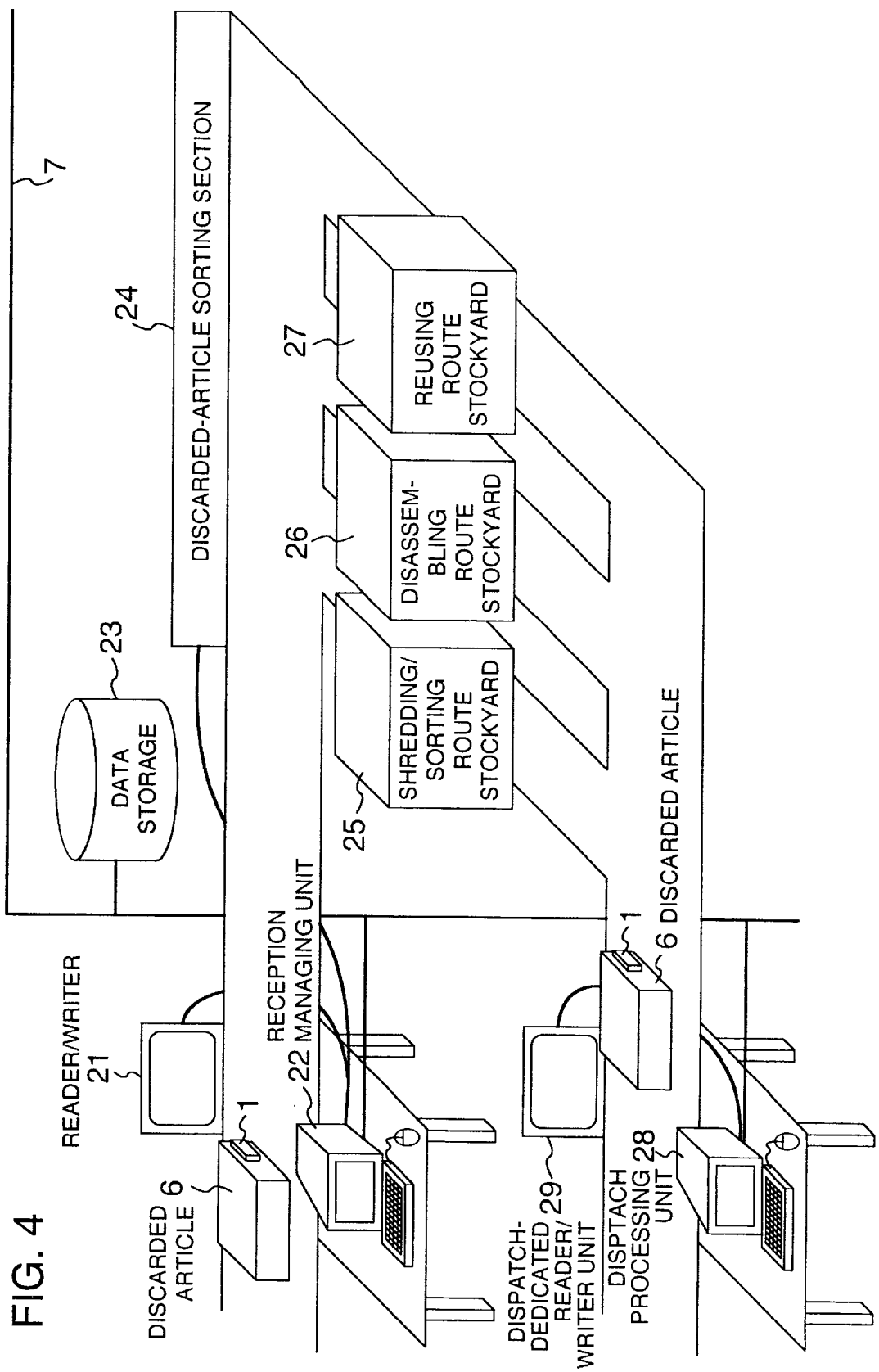

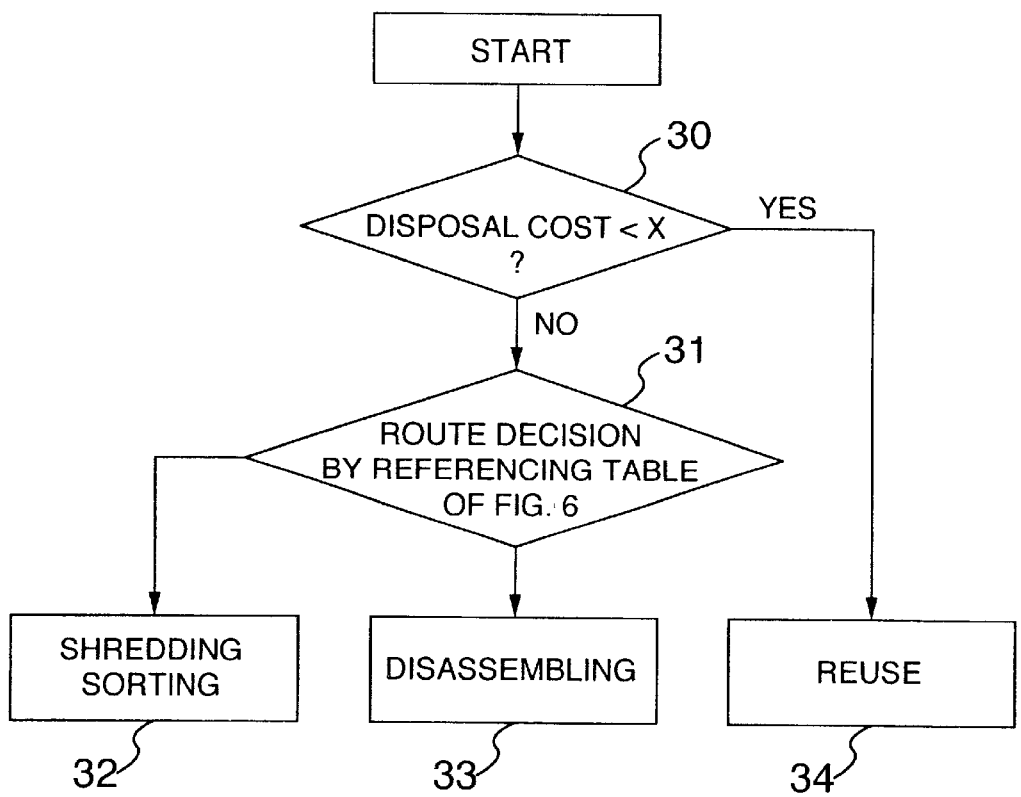

FIG. 9

DISCARDER NAME : ○○○
DISCARDER ADDRESS : ○○○
DISCARDER TELEPHONE NUMBER : ○○○
MANUFACTURER NAME : ○○○
ARTICLE NAME : ○○○
PRODUCT MODEL : ○○○
MANUFACTURE DATE : ○○○
WEIGHT : ○○○
RECEIVED DEALER NAME : ○○○
DATE OF RECEPTION AT DEALER : ○○○
DISPOSAL COST : ○○○
DATE OF DISPATCH FROM DEALER : ○○○
RECOVERY CENTER NAME : ○○○
DATE OF RECEPTION
  AT RECOVERY CENTER : ○○○
DATE OF DISPATCH
  FROM RECOVERY CENTER : ○○○
DISPOSAL CENTER NAME : ○○○
DATE OF RECEPTION
  AT DISPOSAL CENTER : ○○○
DATE OF DISPOSAL : ―――
DETERIORATION PLASTIC : ○○○
QUALITY OF PLASTIC : ○○○
COLOR PLASTIC : ○○○

FIG. 7

DISCARDER NAME : ○○○
DISCARDER ADDRESS : ○○○
DISCARDER TELEPHONE NUMBER : ○○○
MANUFACTURER NAME : ○○○
ARTICLE NAME : ○○○
PRODUCT MODEL : ○○○
MANUFACTURE DATE : ○○○
WEIGHT : ○○○
RECEIVED DEALER NAME : ○○○
DATE OF RECEPTION AT DEALER : ○○○
DISPOSAL COST : ○○○
DATE OF DISPATCH FROM DEALER : ○○○
RECOVERY CENTER NAME : ○○○
DATE OF RECEPTION
  AT RECOVERY CENTER : ○○○
DATE OF DISPATCH
  FROM RECOVERY CENTER : ○○○
DISPOSAL CENTER NAME : ○○○
DATE OF RECEPTION
  AT DISPOSAL CENTER : ―――
DATE OF DISPOSAL : ―――

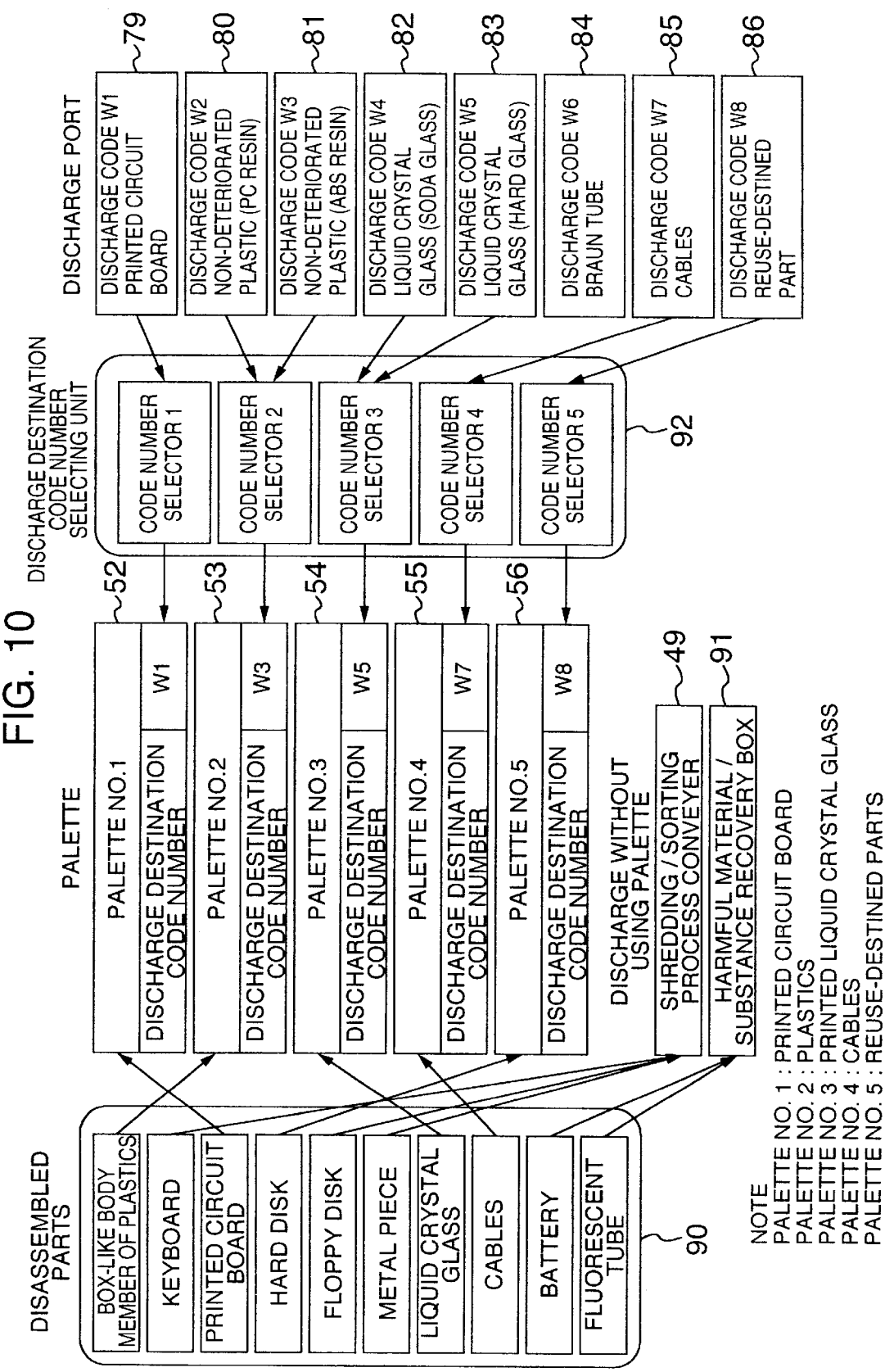

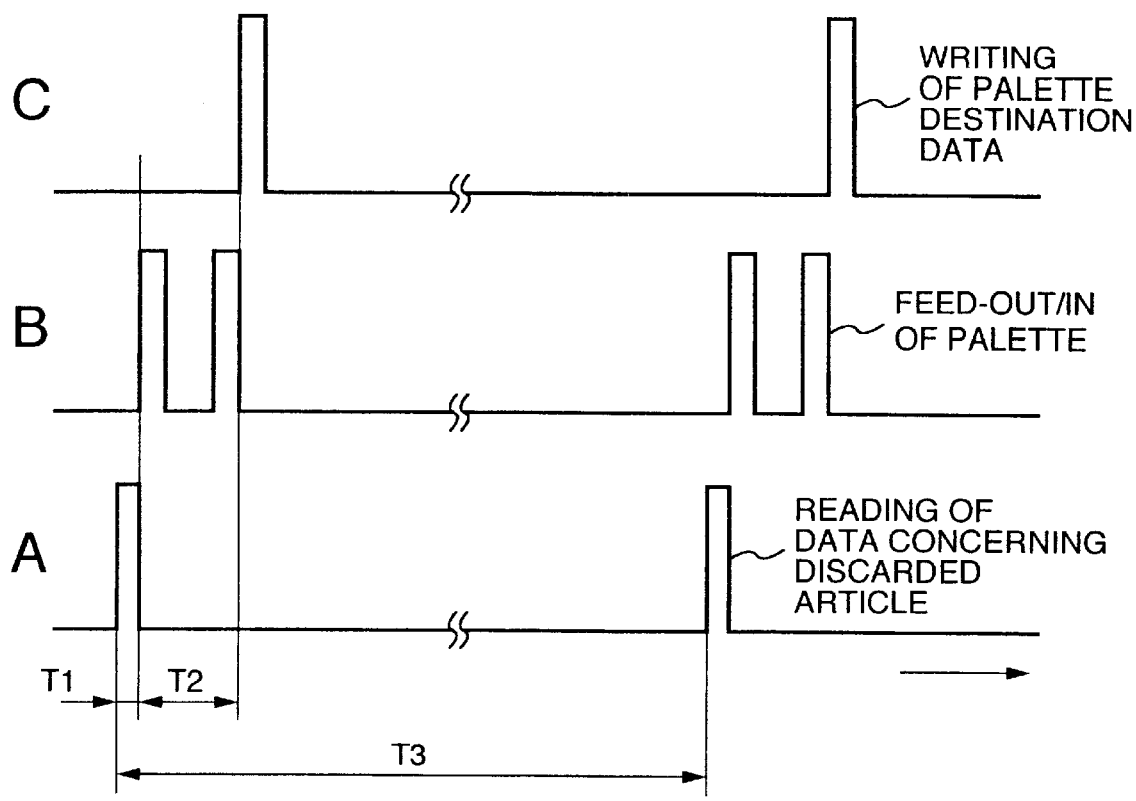

METHOD AND SYSTEM FOR RECYCLING DISCARDED INDUSTRIAL PRODUCTS

BACKGROUND OF THE INVENTION

The present invention relates generally to a discarded industrial product recycling system. More particularly, the invention is concerned with a system for controlling or managing transfers of discarded industrial products, works of disassembling the same and pertinent processing or treatment thereof and assortment of component parts resulting from the disassembling. Hereinafter, the industrial product will also be referred to as the manufactured article or simply as the article only for convenience of the description.

Heretofore, in the recycling of the discarded industrial products, importance is primarily put on the treatments/processings such as shredding or crushing and assortment of metallic pieces for the purpose of recovering metals such as iron, copper, aluminum and the like. In recent years, however, increase of recycle ratio and pertinent disposal of harmful materials and substances are considered as important problems to be solved from the viewpoint of protection of the global environment (planetism). Under the circumstances, in the factories for disposal of discarded articles and wastes, processings relating to the disassembling is gaining more and more importance in addition to the processings involved in the shredding or crushing. With the disposal of the discarded industrial products in which importance is put on the disassembling, recycling of materials, for example, recycling of plastics can be promoted by removing positively harmful materials/substances and assorting accurately and correctly the parts resulting from the disassembling. However, the discarded industrial products undergoing the disposal processing cover great varieties of articles, component parts and materials. Accordingly, disposal of the manufactured articles requires pertinent assortment of the articles themselves and the component parts as well as the pertinent treatments proper to the individual articles. At present, there arise many cases where the cost involved in the disposal of a discarded article (industrial product) is to be burdened by the discarder (i.e., person who discharges the article for disposal as the discard). Accordingly, it is desirable that information concerning the date and the place at which the discarded article was disposed of can be given to the discarder.

As a typical one of the discarded industrial product recycling systems, there can be mentioned, for example, a discarded article recycling system disclosed in JP-A-7-334583. In this system, there are employed an article ID (identifier) reading unit and an article information/data storage unit. In the article information/data storage unit, an article database(s) is stored. Thus, by reading the ID information from the article of concern with the aid of an article ID input unit, processing/treatment of the discarded industrial product can be carried out efficiently by making use of the article database. More specifically, information affixed to the manufactured article concerned is read or alternatively corresponding information is inputted through a keyboard or the like means when the information can not be read directly from the article, whereon the processing is performed on the basis of the input information by referencing the article database. However, in practical applications, the discarded article handled actually carries scarcely useful information. Besides, a great difficulty is encountered in reading the information even with the present-day techniques. Additionally, preparation or structurization of the article database is very difficult because the articles of a same class are manufactured by various makers (manufacturers), new products have been developed for sales one after another, and because the manufactured articles are very abundant in respect to the species or sorts.

As mentioned above, in the discarded industrial product recycling system, there arise many cases where the cost involved in the disposal of the discarded article is to be burdened by the person who discharged that article, i.e., the discarder. Accordingly, it is necessary to manage or control the transfer routes along which the discarded article is handled by recording, e.g. the manufacturer or maker name of that article, the model or type thereof, the reception date, the name of person responsible for the disposal and the date of the disposal. Furthermore, upon disposal of the article, it is required to decide which of the shredding-relevant route and the disassembling-relevant route is to be selected. In the processing directed primarily to the disassembling, assortment of the component parts has to be carried out properly in order to realize the reuse of the component parts, removal of harmful materials/substances recycling or reuse of materials/substances, etc. in dependence on the statuses of the discarded industrial products. In conjunction with the assortment of the disassembled parts (i.e., parts resulting from the disassembling), improvement of accuracy or correctness of the assortment as well as increase of the treatment speed is demanded in order to reduce the cost involved in the disposal while ensuring purity of the materials and substances acquired as the valuables. In particular, in the discarded industrial products, box-like plastic casings or housings are ordinarily used. Accordingly, in order to allow plastics to be reused as a raw material, it is indispensable to carry out the assortment such that plastic materials of high quality can be obtained on a sort-by-sort basis. In order to realize such processing in the practical applications, data required for the processing thereof have to be made available accurately and correctly for each of the manufactured articles. Additionally, in order to enhance the processing or treatment rate, transfer as well as processing of the relevant information should be automatized to a possible maximum extent.

SUMMARY OF THE INVENTION

In the light of the state of the art described above, it is an object of the present invention to provide a discarded industrial product recycling system which can facilitate processings and treatments of discarded industrial products or articles while allowing reliance on the database to be lessened.

Another object of the present invention is to provide a discarded industrial product recycling system which can simplify works involved in assorting parts and/or materials resulting from disassembling.

In view of the above and other objects which will become more apparent as the description proceeds, there is provided according to an aspect of the present invention a discarded industrial product recycling system which includes a process for transferring discarded industrial products discharged by individual discarders (discards sources, so to say) to a disposal center and a process for processing the discarded industrial products at the disposal center, wherein information required for processing each of the discarded industrial products is written in an electronic tag in the course of transferring the discarded industrial products to the disposal center from the individual discarders, and wherein the electronic tags are sent to the disposal center together with the relevant discarded industrial products.

According to another aspect of the invention, there is provided a discarded industrial product recycling system which includes a recovery or collecting center for collecting the discarded industrial products discharged by individuals as discards, a discarded industrial product disposal center for disposing of the discarded industrial products received primarily from the recovery center, wherein electronic tags (RF-ID tags) in and from which data can be written and read are attached to the discarded industrial product or a major component part thereof or a container accommodating therein the discarded industrial product at either the recovery center or the disposal center, and wherein data required for processing is written in and read from the electronic tag by reader/writer apparatuses.

For achieving the second object mentioned above, there is provided according to yet another aspect of the invention, a discarded industrial product recycling system which is comprised of a plurality of palettes, electronic tags affixed to the palettes, respectively, conveyers for carrying these palettes, a plurality of discharge ports for receiving the palettes carried thereto by the conveyers, a write unit for writing in the electronic tag information concerning a destination discharge port of the palette to which the electronic tag is affixed, and a unit for reading the information concerning the destination discharge port of the palette transported by the conveyer means from the electronic tag affixed to that palette, to thereby send the palette selectively to the destination discharge port designated by the destination information.

According to a further aspect of the invention, there is provided a discarded industrial product recycling system which is comprised of a plurality of palettes, palette-dedicated electronic tags which are to be affixed to the palettes, respectively, a first reader/writer unit for writing data in the palette-dedicated electronic tags, discharge ports at which the palettes are unloaded, respectively, and second reader/writer units disposed at the discharge ports, respectively, for reading the data recorded in the palette-dedicated electronic tags, respectively, wherein destination codes indicating destination discharge ports are written in the palette-dedicated electronic tags, respectively. Each of the palettes is carried to the discharge ports where the data recorded in the palette-dedicated electronic tag is read by the second reader/writer unit. When a code read from the palette-dedicated electronic tag coincides with a code of the discharge port, parts/materials on the palette are discharged into the discharge port for which inter-code coincidence has been detected.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2 is a pictorial view for illustrating discarded article receiving facilities at a dealer shop or the like;

FIG. 3 is a view for illustrating data written in an electronic tag at a dealer shop in the system according to the invention;

FIG. 4 is a view for illustrating discarded article receiving facilities at a recovery center or the like;

FIG. 5 is a flow chart for illustrating a sorting process of discarded industrial products;

FIG. 6 is a view for illustrating assortment of discarded articles to a disassembling route and a shredding/sorting route;

FIG. 7 is a view for illustrating data written in an electronic tag at a recovery center in the system according to the invention;

FIG. 9 is a view for illustrating data written in an electronic tag at the disposal center;

FIG. 10 is a view for illustrating assignment of palette unload destination codes;

FIG. 11 is a timing chart for illustrating operations performed on a palette located in the vicinity of a disassembling work table;

FIG. 13 is a view for illustrating assignment of palette unload destination codes.

DETAILED DESCRIPTION OF THE INVENTION

Figure 1:
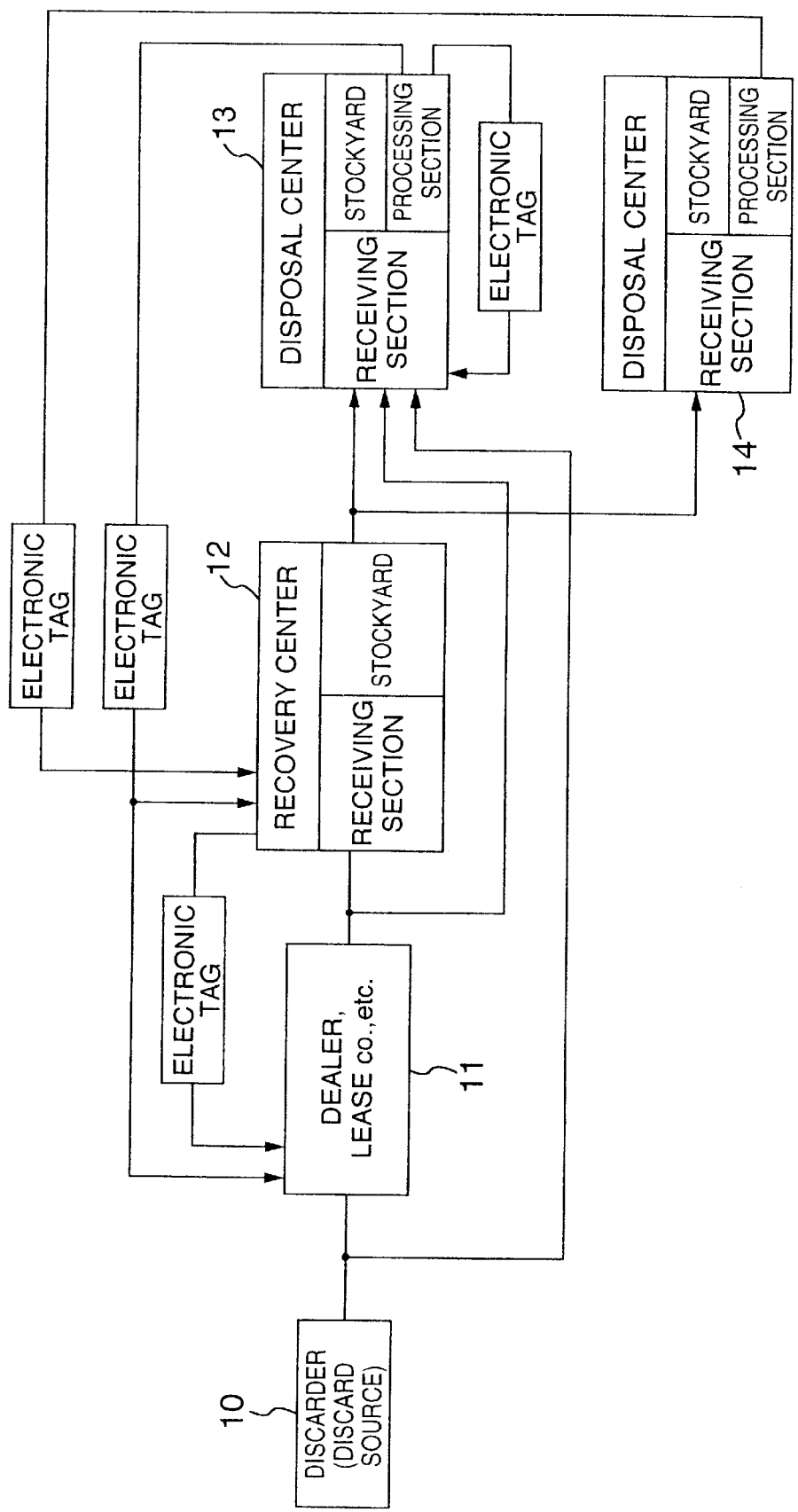
FIG. 1 is a schematic diagram for illustrating transfers or flows of discarded industrial products and electronic tags in a discarded industrial product recycling system according to an embodiment of the present invention.

Now, the present invention will be described in detail in conjunction with what is presently considered as preferred or typical embodiments thereof by reference to the drawings. In the following description, like reference characters designate like or corresponding parts throughout the several views.

It has first to be mentioned that for carrying out the present invention, electronic tags radio-frequency identifier tag or RF-ID tag are attached to discarded industrial products or articles for processing or treatment thereof. Accordingly, description will first be made briefly of the electronic tag before entering into the detailed description of the preferred or exemplary embodiments of the invention. The electronic tags are used in combination or cooperation with a reader/writer unit. Information is written in the electronic tag by means of the reader/writer unit. More specifically, when radio wave of a specific frequency is sent to the electronic tag from the reader/writer unit, the electronic tag receives the radio wave to charge electricity internally for thereby driving an electronic circuit incorporated in the tag, whereby the radio wave is modulated to generate data which is stored in a memory constituting a part of the electronic circuit. On the other hand, when the data written in the electronic tag is to be read therefrom, the reader/writer unit sends the radio wave of a specific frequency to the electronic tag which responds thereto by charging spontaneously electricity to thereby drive the electronic circuit incorporated in the tag, whereby radio wave modulated with the data stored in the electronic circuit is emitted therefrom. Upon reception of the radio wave from the electronic tag, the reader/writer unit acquires the data by demodulating the radio wave. The data reading/writing operation mentioned above is carried out automatically and consecutively, at a time point when the electronic tag enters a communication coverage area of the reader/writer unit. The communication distance between the electronic tag and reader/writer unit wave varies in dependence on the size of the electronic tag (size of an antenna incorporated in the electronic tag). Ordinarily, in the case of the electronic tag of a size comparable to that of an IC card, the distance between the electronic tag and the radio wave at which wireless communication can be performed is in a range of 1 to 2 m, while for the electronic tag of a size approximately equal to that of a semiconductor chip, the communication distance is on the order of 10 cm. In this conjunction, the size of the electronic tag may be selected by taking into account the dispositions of relevant appliances as well as environmental conditions in the work field. Thus, when the electronic tag enters the communication coverage area, data reading/writing operation can be carried out freely.

Now, an exemplary embodiment of the present invention will be described in detail. FIG. 1 illustrates flow or transfers of discarded industrial products and flows of electronic tags in a discarded industrial product recycling system according to an embodiment of the invention. Ordinarily, a discarded industrial product (e.g. manufactured article to be discarded) is discharged by a discarder (discard source) 10 to be delivered to a recovery center 12 by way of a dealer 11, whereon it is sent to a disposal center 13. On the way of the route mentioned above, the discarded industrial product may be sent directly to the disposal center 13. For example, some discarded industrial product may be sent to the disposal center 13 from the discarder 10, while some the discarded industrial products may be directly sent to the disposal center 13 from the dealer 11. In the case where the discarded article is sent directly to the disposal center 13 from the discarder 10 or when the electronic tag system is installed neither at the dealer 11 nor at the recovery center 12, an electronic tag is attached to the discarded industrial product at a receiving section of the disposal center 13, whereon the data required for the processing/treatment of the discarded industrial product is written in the electronic tag by means of a reader/writer unit, which will be described in more detail later on.

The discarded industrial products may undergo immediately the processing/treatment or after having been stored temporarily at a stockyard of the disposal center 13. At that time point, the electronic tag is detached from the discarded article to be returned to the article receiving section of the disposal center 13. In the case where the discarded article is delivered from the dealer 11, the electronic tag may be attached to the discarded article at the dealer shop, whereon data required for the processing/treatment is written in the electronic tag by the reader/writer unit.

The electronic tag attached to the discarded industrial product sent to the disposal center 13 is detached upon treatment thereof to be returned to the dealer 11. On the other hand, when the discarded industrial product is to be sent to the disposal center 13 from the recovery center 12, the electronic tag is attached to the discarded industrial product at the recovery center 12. After the processing/treatment at the disposal center 13, the electronic tag is returned to the recovery center 12 from which the electronic tag is sent back to the dealer 11. There may arise such a case where the discarded industrial product is sent from the recovery center 12 to another disposal center 14. In that case, the electronic tag is returned to the recovery center 12. In many practical cases, one disposal center is supplied with discarded industrial products from a number of recovery centers. In these cases, electronic tags are attached at the recovery centers, and they are sent back to the recovery centers after detachment at the disposal center.

In this manner, the electronic tags are repetitively used within a loop composed of the dealer 11, the recovery center 12 and the disposal center 13 or 14. Accordingly, the number of the electronic tags as required can be made extremely smaller when compared with that of the discarded industrial products.

FIG. 2 is a view for illustrating exemplarily reception of the discarded industrial product primarily at the dealer shop 11. Initially, data is written in the electronic tag 1. Both the data inputted through a keyboard or with a mouse of an input unit 2 and the data stored previously in the input unit 2 are sent to a reader/writer unit 3 to be transmitted to an electronic tag 1 via an antenna 4. Additionally, the data inputted by using the keyboard or the mouse is stored in the input unit 2 and at the same time sent to a printer 5, whereby a chit printed with the data is delivered to the discarder as a receipt. Electronic tags 1a and 1b in which the data have been written, respectively, are attached to discarded industrial products 6a and 6b, respectively. In this case, it is assumed, only by way of example, that the discarded industrial product is a personal computer, wherein the reference numeral 6a denotes a main body of the personal computer and 6b denotes a display unit.

As the data to be written in the electronic tag 1, there can be mentioned, for example, represented by discarder name, discarder address, discarder telephone number, manufacturer name of the discarded article, article name, product model, manufacture date (year and month), weight, received dealer name, reception date and disposal cost, as illustrated in FIG. 3. Of the data mentioned above, the name of the dealer received the article and the date of reception are automatically written in the electronic tag from the input unit 2, whereas the other data are inputted by using the keyboard and/or the mouse. In FIG. 3, symbols ○○○ represents the field of the electronic tag at which the data have been written, while symbols --- represents the fields at which no data has been written yet.

The discarded industrial products received at the dealer shop are temporarily stocked until the discarded articles as received amount to a predetermined quantity and then sent to the recovery center. At this time point, the discarded industrial products are caused to pass by or through the reader/writer unit 3. After confirmation that the electronic tag attached to the discarded industrial product is located within the communication coverage area of the reader/writer unit 3, the date of dispatch from the dealer and the name of the recovery center, the destination to which the discarded industrial product is to be sent, are written in the electronic tag and at the same time saved in the input unit. In order to evade error in writing the data, such measures may be taken that a buzzer is activated when the data writing operation has been completed correctly without involving any error, for thereby allow the dealer to confirm the completion of the data writing. The input unit 2 is electrically connected to the recovery center 12 and the disposal center 13 via a telephone line 7 or the like so that the data resident in the input unit can be viewed or checked at the recovery center and the disposal center. By virtue of this arrangement, the stocked state of the discarded industrial products at the individual dealers can be observed or confirmed at the recovery center, which in turn means that recovering schedules of discarded industrial products for the individual dealers can be so planned that the discarded industrial products can be recovered with high efficiency. In this conjunction, it should also be mentioned that data concerning the reception of the discarded industrial products at the recovery center 12 and the results of disposal thereof at the disposal center 13 can be written in the input unit installed at the dealer shop via the telephone line 7 or the like. Thus, at the time point at which the processing/ treatment or disposal of the discarded industrial product has been completed, the data to be written at the rows indicated by "---" in FIG. 3 are finally written in the input unit installed at the dealer shop. In this way, the dealer can confirm the date of disposal of the discarded industrial product and can give corresponding information to the discharger of concern.

In the case of the embodiment described above, it is presumed that the discarded industrial products are received at the dealer shop. When the discarded industrial products are to be received at the recovery center 12 or the disposal center 13, the equipments and the facilities illustrated in FIG. 2 can be disposed at the recovery center 12 or the disposal center 13. Further, when the number of discarded industrial products to be handled is large for several species or sorts, the discarded industrial products may be accommodated within containers on a sort-by-sort basis. In that case, the electronic tags may be attached to the containers one by one. In this way, management and transport of the discarded industrial products can be much facilitated.

As can be understood from the foregoing, writing of the data in the electronic tag can be carried out at the dealer shop or the recovery center without fail. By way of example, since many of the discarded industrial products delivered to a dealer are ordinarily those handled or sold once by the same dealer, it is possible for the dealer to determine whether or not the discarded industrial product as received is in the state ready for reuse or estimate the cost involved in disposal of the discarded article with high accuracy for detail, to an advantage. Besides, since the number of the discarded industrial products to be handled by the dealer is ordinarily relatively small, there will arise no necessity of employee for writing the data in the electronic tags. Additionally, because each of the discarded industrial products is attached with the relevant electronic tag, there is no need for verifying the discarded industrial product by affixing a corresponding slip or chit. Thus, reception and sending of the discarded industrial products can be carried out smoothly.

FIG. 4 is a view for illustrating reception of discarded industrial products primarily at the recovery center 12. Referring to the figure, the discarded industrial product denoted by numeral 6 has been affixed with the electronic tag 1 at the dealer shop, wherein the data required for the processing/treatment or disposal of the discarded article have been written in the electronic tag 1, as illustrated in FIG. 3. The discarded industrial product 6 is fed by a conveyer. When the article 6 enters the communication coverage area of a reader/writer unit 21, the latter reads the data from the electronic tag attached to the article 6 to check whether omission or error exists in the data contents. Further, the reader/writer unit 21 writes data of the name of the recovery center and the date of reception at the recovery center in the electronic tag. The recovery center name and the reception date can be automatically generated by a reception managing unit 22. The data read from the electronic tag 1 is stored in a data storage 23. The discarded articles 6 passed through the reader/writer unit 21 are classified at a discarded article assorting section 24 into three classes corresponding to three different routes in accordance with a processing procedure illustrated in a flow chart of FIG. 5. Referring to the figure, it is first decided in a step 30 whether or not the disposal cost is less than "X". When the disposal cost is smaller than "X" (i.e., when the decision step 30 results in affirmation "yes"), a route 34 for reuse (reuse rout) is selected. This is because some money will have to be paid to the discarder upon reception of the article when the discarded article as received is recognized as a reusable one. By contrast, in the case where the disposal cost has been paid by the discharger, the processing proceeds to a step 31 where it is decided by referencing an article name table shown in FIG. 6 whether the discarded article now of concern is destined to be sent to a shredding/sorting route 32 or alternatively to a disassembling route 33. Parenthetically, the table illustrated in FIG. 6 is prepared previously and stored in the reception managing unit 22 or the data storage 23. The discarded industrial products as sorted are stocked correspondingly at a shredding/sorting route stockyard 25, a disassembling route stockyard 26 and a reuse route stockyard 27, respectively. When the discarded industrial product is sent to the disposal center, the date of dispatch and the name of the destination disposal center are written in the electronic tag by a dispatch-dedicated reader/ writer unit 29 via a dispatch processing unit 28 and at the same time stored in the data storage 23. Thus, the data having been written in the electronic tag at this stage will be such as illustrated in FIG. 7.

The articles sent out from the shredding/sorting route stockyard 25 are sent to the disposal center designed primarily for shredding, while the discarded industrial products sent out from the disassembling route stockyard 26 are supplied to the disposal center designed primarily for disassembling. Further, the discarded industrial products sent out from the reuse route stockyard 27 are furnished to secondhand stores or the like. By assorting the articles in this manner, processing/treatment or disposal thereof can be carried out effectively. When all the treatments/processings as required can be carried out at one disposal center, an article assorting section such as illustrated in FIG. 4 is provided in that one disposal center.

Figure 8:
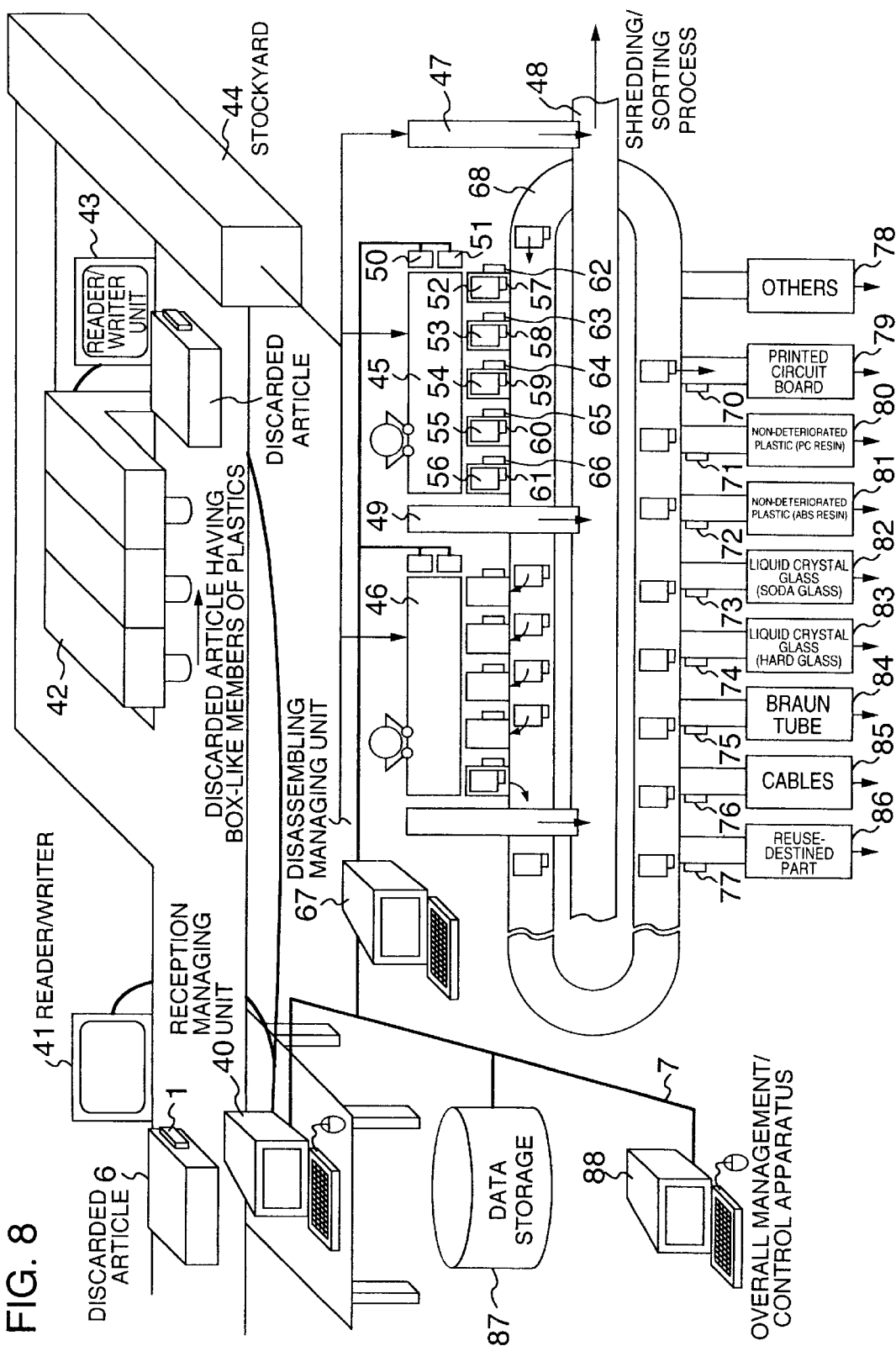
FIG. 8 is a view for illustrating flows of processings for discarded articles as well as transfers thereof at a disposal center in the system according to the invention.

FIG. 8 is a view for illustrating a flow of processings at a disposal center which is designed primarily for disassembling personal computers, printers and the like and additionally for the processing or treatment for recycling plastic materials of box-like casings or housings. Now, description will be made of a flow of treatments/processings of the discarded industrial products by taking as examples thereof main bodies of personal computers. Data of the electronic tag 1 attached to the discarded industrial product (main body of a personal computer) 6 is read by a reader/writer unit 41 through a reception managing unit 40 to thereby decide whether or not the discarded industrial product has box-like casing made of plastic on the basis of the manufacturer name, name of the article and the product model thereof. It is assumed that data concerning presence or absence of the plastic box-like members corresponding to the articles and the product models thereof have been written previously in a data storage 87. However, when the above-mentioned data is not written in the data storage 87, operator in charge has to decide the presence or absence of the plastic box-like members through visual observation or measurement to thereby input the results thereof through the reception managing unit 40 or an overall management/control apparatus 88. Retrieval operation is performed for the data storage 87 by the reception managing unit 40, and when it is decided that the discarded industrial product has the plastic box-like members, the discarded industrial product now of concern is transferred to a plastic material measurement line. On the other hand, when the discarded industrial product includes scarcely the plastic box-like members, it is transferred directly to a stockyard 44.

In the plastic material measurement line, measurement is performed by a measuring unit 42 in respect to the degree of deterioration, quality and color, the results of which are additionally written in the electronic tag by means of a reader/writer unit 43, whereon the discarded article undergone the measurement is transferred to the stockyard 44. At this stage, the data stored in the electronic tag are such as illustrated in FIG. 9.

The discarded industrial products sent out from the stockyard are as sorted into to be those sent to work tables 45 and 46 for disassembling and those to be sent to a shredding/sorting process conveyer 48 via a conveyer 47. By way of example, personal computers, television sets and the like are sent to the work tables 45; 46, while refrigerators, washing machines and the like are sent to the shredding/sorting process conveyer 48 via the conveyer 49.

At the work table 45, data stored in the electronic tag attached to the discarded industrial product is read by a reader/writer unit 50, whereon the date of disposal of this discarded article is added to the tag data by means of a disassembling managing unit 67. The tag data added with the date of disposal of the discarded article is then stored in a disposal center storage 87. The data storage 87 and the overall management/control apparatus 88 are electrically connected to the dealer shops and the recovery center(s) by the telephone line 7 or the like so that the data of the disposal date can be furnished to the dealer and the recovery center recorded in the electronic tag. In this way, the dealer and the personnel at the recovery center can know the dates of disposal of the discarded industrial products handled by them. On the other hand, the overall management/control apparatus 88 is so designed as to be capable of recognizing the data concerning the dealer and the recovery center and serving for management or control of the disposal center as a whole. Major roles of the overall management/control apparatus 88 is to manage the contents of the data storage 87 by modifying and/or adding data and carry out data transfers with the dealers and the recovery center(s) via the telephone line 7 or the like.

Provided in association with the work table 45 are a reader/writer unit 50 and five pallets 52, . . . , 56, wherein these pallets are attached with palette-dedicated electronic tags 57 to 61, respectively. Further, reader/writer units 62 to 66 are provided for the palette-dedicated electronic tags 57 to 61, respectively. The disassembling managing unit 67 is electrically connected to the reader/writer units 50 and 62 to 66 and a palette control unit 51 and adapted to perform management and control of data exchange with and/or among them. The electronic tag attached to the pallet constantly remains in the attached state. The data carried by the electronic tags attached to the discarded industrial products, respectively, are read by the reader/writer unit 50, whereby destinations of the individual pallets are determined on the basis of the data read from the electronic tags, whereby corresponding destination code numbers are written in the electronic tags affixed to the pallets, respectively. Attendant worker disassembles or decomposes the discarded industrial product. Parts resulting from the disassembling are disposed on the pallets. The pallets loaded with the disassembled parts are sent to a transfer line 68 under the control of the palette control unit 51 to be transported along the transfer line 68, to thereby discharge the disassembled parts to the appropriate discharge ports 78 to 86 in accordance with the code numbers, respectively.

The operations or procedure briefly mentioned above will be described in detail by reference to FIG. 10 on the presumption, only by way of example, that the discarded industrial product of concern is a notebook-type personal computer. In general, the notebook-type personal computer can be decomposed into about ten component parts 90. The palettes are assigned with the ID numbers, respectively. More specifically, the palette 52 is assigned with "No. 1", the palette 53 is assigned with "No. 2", . . . , and the palette 56 is assigned with "No. 5" (see FIG. 8). Further, correspondence relations between the individual palettes and the component parts to be loaded thereon are established previously. More specifically, in the case of the illustrated example, it is presumed that the palette "No. 1" is destined for receiving printed circuit boards, the palette "No. 2" is for plastic box-like members or the like, the palette "No. 3" is for liquid crystal glass plates, the palette "No. 4" is for cables, and the palette "No. 5" is destined for receiving reuse-destined parts. The component parts to be discharged by other means than the palettes are classified into those to be sent to the shredding/sorting process and those to be contained within a harmful material/substance recovery box 91 disposed at a side of the work table. In the case of the instant example, keyboards, floppy disks, metallic pieces are placed on a conveyer 49 which leads to the shredding/sorting process. On the other hand, batteries and fluorescent tubes are put into the harmful material/substance recovery box 91 mentioned above. The other component parts are placed onto the relevant palettes, as illustrated in FIG. 10. In the palette-dedicated electronic tags affixed to the individual palettes "No. 1" to "No. 5", discharge destination code numbers are written by the reader/writer units 62 to 66, respectively. There are provided eight discharge destination code numbers W1 to W8 in correspondence to the discharge ports 79 to 86, respectively. A discharge destination code number selecting unit 92 includes code selectors which correspond to the palettes "Nos.", respectively. The discharge destination code numbers corresponding to the palette-dedicated electronic tags are selected from the discharge destination code numbers W1 to W8. The selection of the code number is carried out by the disassembling managing unit 67 on the basis of the data (such as the manufacturer name, product model and plastic box-like members) held by the electronic tag attached to the discarded industrial product. By way of example, for the palette "No. 1", the discharge destination code number W1 is selected. For the palette "No. 2", the discharge destination code number W3 is selected. For the palette "No. 3", the discharge destination code number W5 is selected. For the palette "No. 4", the discharge destination code number W7 is selected. Finally, for the palette "No. 5", the discharge destination code number W8 is selected. For the palette "No. 2", the discharge destination code number W2 or W3 is selected on the basis of the data concerning the plastic box-like members. Further, for the palette "No. 3", the discharge destination code number W4 or W5 is selected on the basis of the manufacturer name and the product model.

Although it is assumed that there exist two kinds (W2, W3) of discharge ports for the plastic materials, this is only for convenience of the description. The sorts of the plastic materials may be increased. Besides, there may be provided more than two discharge ports for the plastic materials on a manufacturer-by-manufacturer basis. For the Braun tube W6, a palette provided in association with the work table 46 can be employed. In this manner, the code numbers can be established in correspondence to the discharge destinations, respectively.

Next, referring to a timing chart shown in FIG. 11, description will be directed to flows of component parts resulting from the disassembling around the work table.

Referring to FIG. 11, data read operation of the reader/writer unit 50 is illustrated at the bottom row A. On the other hand, operation of the palette control unit is illustrated at B while data write operations of the reader/writer units 62 to 66 are illustrated at C. When an electronic tag attached to a discarded industrial product enters the communication coverage area of the reader/writer unit 50, data reading operation is performed by the reader/writer unit 50. Upon completion of the data reading operation performed for a time duration T1, the palette control unit 51 receives a signal indicating the completion of the data reading operation, whereon the palettes 52 to 56 are sent out onto the transfer line 68. After the sending of the individual palettes, other palettes incoming along the transfer line 68 are received. This operation is performed during a time period T2. In response to a signal indicating completion of the palette receiving operation, the reader/writer units 62 to 66 disposed in the vicinity of the individual palettes, respectively, write the discharge port code numbers in the electronic tags affixed to the individual palettes, respectively. In this conjunction, the discharge port code numbers can be determined in accordance with the method described previously by reference to FIG. 10.

After having detached the electronic tag from the discarded industrial product, the latter is disassembled, and the component parts as detached are put in the predetermined palettes, respectively . The electronic tag is recovered through another process to be sent back to the recovery center, the dealer, etc. However, in the case where a reuse-destined part exists, the electronic tag is affixed to the reuse-destined part before it is put in the relevant palette. When there exist a plurality of reuse-destined parts, a corresponding number of electronic tags are prepared additionally, and data of the relevant discarded article are written in these electronic tags by the reader/writer unit 50, whereon the electronic tags are affixed to the reuse-destined parts, respectively. Upon completion of the work described above, the worker places a succeeding discarded industrial product on the work table. When the discarded industrial product enters the communication coverage area of the reader/writer unit 50, the contents or data recorded in the electronic tag is automatically read by the reader/writer unit 50. At this time point, a time T3 has elapsed since the preceding electronic tag reading operation, as is illustrated in FIG. 11 at A. To say in another way, the time span T3 represents the time taken for disassembling one discarded industrial product and sorting the disassembled parts. The time taken for the disassembling is written in the data storage 87 for every discarded industrial product. By storing sequentially and accumulatively the disassembling times for the discarded industrial products of every species in the data storage 87, the species of the articles which are difficult to disassemble can be statistically determined. The statistic data collected in this way may be fed back to a relevant design engineer with the aim of aiding him or her in designing the article of a structure which is easy to disassemble. Such accumulative storage of statistical data may be carried out not only for the disassembling time but also for the articles having plastic box-like members which are easy to undergo material recycling.

The individual palettes sent out onto the transfer line 68 are fed towards the reader/writer 70, . . . , 77 disposed at the discharge ports 78, . . . , 86, respectively. The reader/writer units 70, . . . , 77 read the data (code numbers) carried by the electronic tags affixed to the palettes, respectively, wherein the parts carried by the palette for which coincidence is found in respect to the code number are discharged into the proper discharge port assigned with that code number. In the case where coincidence of the code numbers is found by none of the reader/writers 77 to 70 as viewed in the transporting direction of the transportation line 68, the parts carried on the palette are discharged into the discharge port 78. Thus, it can be ensured that no component parts are left on the palette even when reading error should occur. In this conjunction, the discharge port 78 should preferably be so designed as to collect the parts abundant in dust components.

Figure 12:
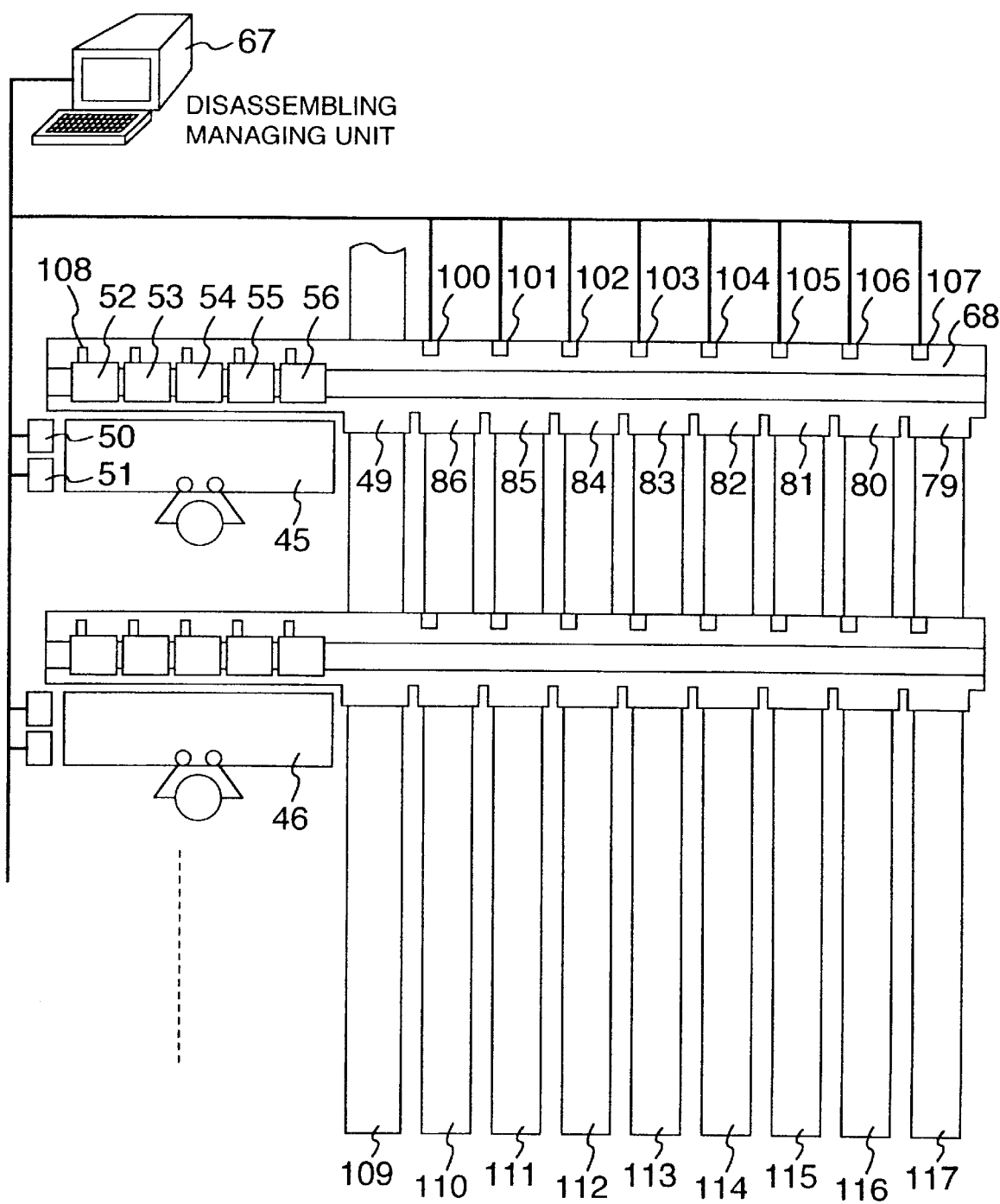
FIG. 12 is a view for illustrating assortment of parts resulting from disassembling of discarded articles in a system according to another embodiment of the present invention.

With the system arrangement shown in FIG. 8, the palettes can be transported to given or desired discharge ports. However, when the number of the work tables increases, a traffic congestion or jam, so to say, may take place in the transfer line 68. FIG. 12 shows an arrangement according to another embodiment of the invention which may preferably be adopted in the case where a large number of work tables are provided. As can be seen in the figure, a transfer line denoted by numeral 68 is provided in association with a work table denoted by numeral 45, wherein a plurality of palettes 52, . . . , 56 are made available. Further, switches 100, . . . , 107 are provided along the transfer line 68 in association with discharge ports 79, . . . , 86, respectively. Each of the palettes 52, . . . , 56 is equipped with a cam 108 for actuating the switches 100, . . . , 107. When a discarded industrial product enters the communication coverage area of the reader/writer unit 50, data recorded in the electronic tag affixed to that discarded industrial product are read. On the basis of the data read from the electronic tag, the disassembling managing unit 67 determines the destinations for the individual palettes 52, . . . , 56, respectively. In that case, the individual palettes are driven one by one under the control of the palette control unit 51 to be transported while actuating successively the switches 100, . . . , 107. The transportation of the palette is stopped at a predetermined position determined by a predetermined number of switches 100, . . . , 107 which has or have been actuated by the cam mounted on the palette. This will be described by reference to FIG. 13 on the assumption that the part sorting job is same as that illustrated in FIG. 10. More specifically, FIG. 13 shows relations between the palette ID numbers (Nos.) and the destinations of the palettes in combination with actuations of the individual 100, . . . , 107. By way of example, the palette identified by "No. 3" is presumed to be transported up to the discharge destination assigned with the code number W5. To this end, the switches provided at the discharge destinations assigned with the code numbers W1 to W5, respectively, have to be actuated by the cam mounted on the palette "No. 3". In this conjunction, actuation of the switches provided at the discharge destinations assigned with the code numbers W1, . . . , W8 which is required for the individual palettes to reach and stop at the respective destinations are indicated by "1", whiles the switches which need not be actuated are indicated by "0" in FIG. 13. The correspondence setting mentioned above can be realized by the disassembling managing unit 67 on the basis of the data recorded in the electronic tags attached to the palettes, respectively. On the other hand, the palette control unit 51 is so designed as to stop the palette at the time point when actuation of a predetermined number of switches (e.g. switches of the discharge destination code numbers W1 to W5 for the palette "No. 3") has been detected. Thus, the palette can be stopped at the proper destination discharge port thereof. In succession, the component parts on the palette are discharged onto a relevant conveyer 109, . . . , or 117. Incidentally, the conveyer 109 serves as the shredding/sorting process conveyer.

With the arrangement described above, the component parts carried on the palettes can be transported to the pertinent discharge destinations, respectively, and thus the component parts collected at the discharge ports have been sorted from one another with high reliability or without fail. Among others, collection of the plastic box-like members can ensure availability of high-purity plastic materials which suffer scarcely deterioration. Incidentally, the plastic parts are shredded (or crushed) by a shredder (or a crusher) to a size suited as a raw material for mold goods and shipped to a pertinent dealer after cleaning. In this way, the material recycle of plastics can be promoted. Since the printed circuit boards contain lead, they are processed by an apparatus designed for treating the printed circuit boards or they may be transferred to a professional for proper treatment. Same applies valid to the batteries and the fluorescent tubes. Further, soda glass and hard glass are usually used for the liquid crystal glass plates, there should preferably be sorted into soda glass and hard glass for reuse. The arrangement described above by reference to FIG. 12 can satisfactorily cope with the sorting mentioned above.

Figure 14:
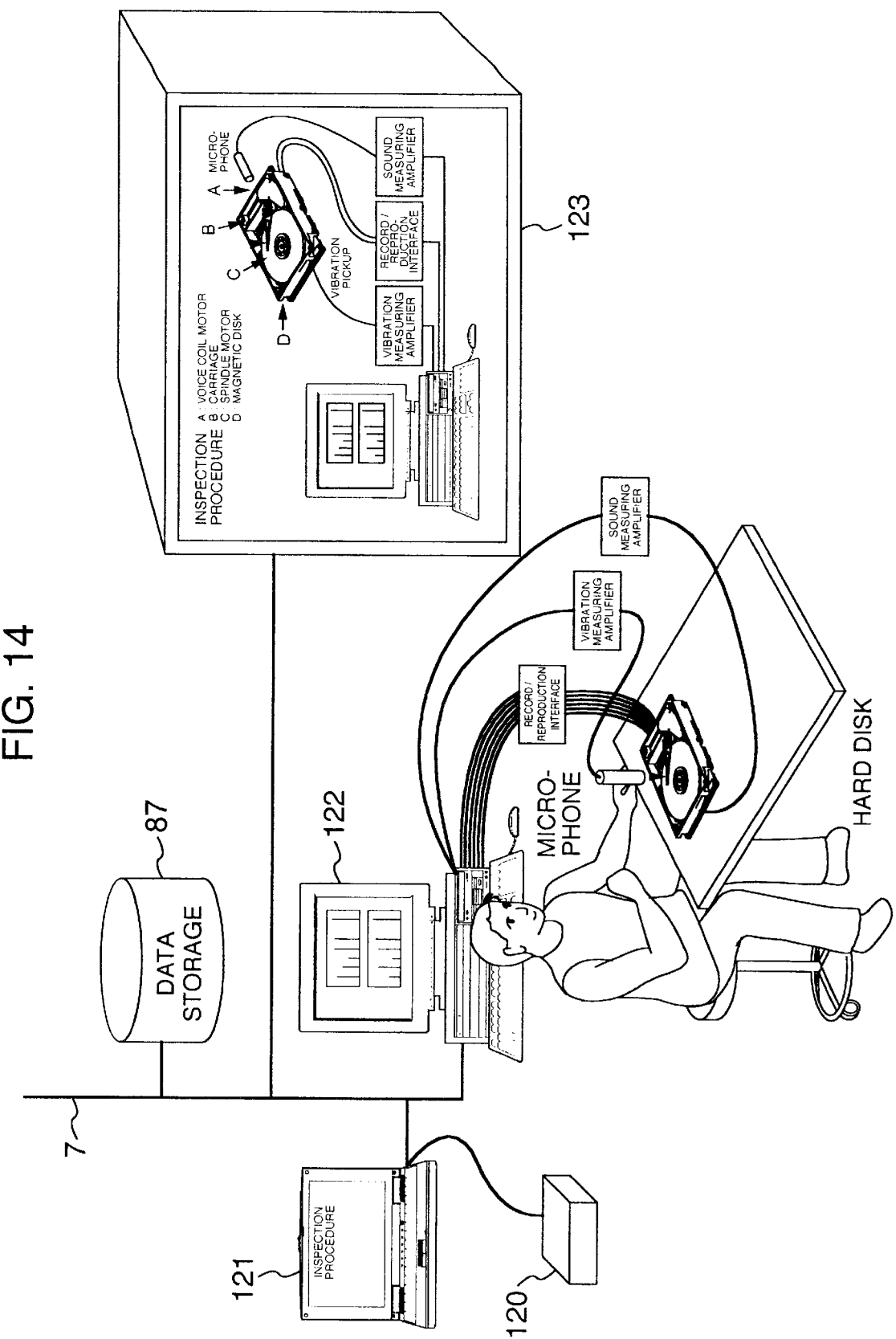
FIG. 14 is a pictorial view for illustrating an inspection process for reuse-destined parts in a system according to the invention.

FIG. 14 is a pictorial view for illustrating an inspection process for reuse-destined parts. The reuse-destined parts are sent to a secondhand-article dealer or the like from the recovery center to undergo inspection at the secondhand-article dealer or alternatively they may be inspected, tested or checked at the disposal center. As mentioned previously, the reuse-destined part is affixed with the electronic tag in which data concerning the relevant discarded industrial product are written or recorded. The data of the electronic tag is fetched into an inspection managing unit 121 via a reader/writer unit 120.

Referring to FIG. 14, the data storage 87 stores therein an inspection procedure on the basis of which inspection of the reuse-destined parts is performed. As the typical reuse-destined parts, there may be mentioned power source units, hard disks and the like. In the following description, however, it is assumed, by way of example only, that the reuse-destined part of concern is a hard disk. The inspection managing unit 121 fetches data concerning the inspection procedure from the data storage 87. Since the data concerning the relevant article has been read by the reader/writer unit 120, data for the inspection procedure are retrieved from the article-related data to be subsequently displayed on a parts inspection procedure display unit 123. Connected to the inspection managing unit 121 is an inspection-dedicated personal computer 122 to which a hard disk subjected for inspection is connected. By accessing the inspection managing unit 121, the inspection procedure is displayed on the part inspection procedure display unit 123. In accordance with the inspection procedure being displayed, the worker records and reproduces test data on and from the hard disk with the aid of the inspection-dedicated personal computer 122 by resorting to the use of a sound level meter and a vibration pickup device. At that time, the worker or operator checks presence or absence of abnormality in the result of the recording/reproduction and presence or absence of abnormalities of vibration and sound level. When no abnormality is detected, the part of concern (i.e., hard disk in the instant case) is decided as being passable. The results of the inspection or test are written in the data storage 87 regardless of the presence or absence of the abnormality automatically in combination with the manufactured article data recorded in the electronic tag. The results of the inspection/test can be printed out, as occasion requires, and utilized as data for the inspection/test result specification upon shipping of the parts (hard disks in this case) . Furthermore, arrangement may be made such that the test data are available for the article design engineer via the telephone line 7 or the like, which is helpful for him or her in designing the article or product in the future. Besides, by collecting the trouble indicating information, the inspection method can be improved, to another advantage.

As will be appreciated from the forgoing, because the data of the discarded industrial product are recorded in the electronic tag affixed to the reuse-destined parts, the inspection procedures for the reuse-destined parts can be generated to be displayed while the result of the inspection or test can be managed in combination with the data concerning the relevant article. In this way, the reuse-destined parts can be inspected or tested smoothly with high accuracy, whereby reuse of component parts of the discarded industrial product can be ensured with high reliability.

At this juncture, it should be mentioned that the inspection procedure display function can equally be incarnated in the disassembling procedure display unit because of the availability of the data recorded in the electronic tag.

As will now be appreciated from the foregoing description, the discarded industrial product recycling system according to the present invention can enjoy advantageous actions and effects which will be mentioned below.

Since one-to-one correspondence is established between the electronic tags and the discarded industrial products or the palettes discretely and respectively, the information required for disposal of the discarded industrial product can be transferred concurrently with the transfer of the product, whereby management of the discarded industrial products and the attendant slips can be rendered unnecessary. Further, since data as required occasionally can be additionally recorded in the course of transfer of the discarded industrial product, the data required for treatment or processing can always be moved together with the discarded industrial product. Parenthetically, when the storage capacity of the electronic tag is small, the information may be written in an encoded form so that the encoded data can be decoded by issuing enquiries to the disposal managing system which is managed by a computer. In this way, it is possible at the recovery center or the disposal center to write in the electronic tag the discarder name, date of receiving the discarded industrial product, manufacturer name, product model, name of person responsible for the disposal, date of disposal, etc. and stock temporarily at the stockyard or deliver the articles straightforwardly to the processing/treatment line. Furthermore, at the time point when the processing or treatment is carried out at the disposal center, the information recorded in the electronic tag affixed to the discarded industrial product can be read by the reader/writer, whereon the data is sent to the data storage for storing the disposal date or alternatively the disposal date is additionally written in the electronic tag. Thus, by reading the information recorded in the electronic tag recovered finally, it is possible to manage the flow or route along which the discarded industrial product has been handled, starting from the reception to the disposal.

For those of the discarded industrial products which have box-like members of plastics, data required for the processing/treatment or disposal thereof are written in the electronic tag. The data or information to be written additionally is degree of deterioration, quality and color of plastic box-like members which can be obtained by using an apparatus or apparatuses designed for measuring these attributes. Data obtained as the result of the measurement can be additionally written in the electronic tag by a reader/writer to be used for the selective sorting of the plastic box-like members.

In conjunction with the carrying out the processing/treatment of a discarded industrial product, there can be provided an assortment decision means for making decision on the basis of the information recorded in the electronic tag affixed to the discarded industrial product whether the discarded industrial product is to be sent to the shredding/sorting route or to the disassembling route, whereby the disposal route pertinent or optimal for the discarded industrial product can be selectively determined properly. In most of the practical cases, data concerning the assortment of any given discarded industrial product is previously stored in the electronic tag affixed thereto. However, when complicate decision is required concerning the assortment, the decision can be made by issuing a corresponding query to the disposal managing system.

As can now be appreciated from the foregoing, by attaching or affixing the electronic tag (RF-ID tag) to the discarded industrial product and writing basic data concerning the discarder name and the reception date as well as the discarded industrial article by the reader/writer unit, data obtained subsequently can be written automatically in the electronic tag. By virtue of this feature, the management of article transfer can be facilitated, whereby laborsaving can be realized. Besides, because the assortment/classification processing of the manufactured articles and the disassembled parts can be carried out essentially without fail, optimal disposal route can be selected for each of the discarded industrial products. Thus, material recycle of the plastic box-like members and recycling of component parts can be realized very effectively.

What is claimed is:

1. A system for recycling discarded industrial products, including a process for transporting discarded industrial products discharged from individual discard sources to a disposal center and a process for treating of said discarded industrial products at said disposal center, wherein information required for treating each of said discarded industrial products is written in an electronic tag affixed to each of said discarded industrial products in the course of transferring said discarded industrial products to said disposal center from said individual discard sources, said electronic tag being sent to said disposal center together with said discarded industrial product affixed to said discarded industrial products.

2. A discarded industrial product recycling system according to claim 1,
   wherein said electronic tag sent to said discarded industrial product disposal center, being affixed to said discarded industrial product, is sent back to a place where said information has been written in said electronic tag.

3. A discarded industrial product recycling system, including,
   individual discard sources from which industrial products are discharged as discarded industrial products,
   dealer agencies, lease agencies and rental agencies for collecting discarded industrial products primarily from said individual discard sources,
   at least one recovery center for collecting the discarded industrial products primarily from said dealer agencies, said lease agencies and said rental agencies, and
   a disposal center for treating of the discarded industrial products received primarily from said recovery center,
   wherein an electronic tag in and from which data can be written and read is attached to said discarded industrial product or alternatively a major component part thereof or alternatively a container accommodating therein said discarded industrial product at one of said dealer agencies, said lease agencies, said rental agencies, said recovery center and said disposal center, and
   wherein data required for recycling is written in and read from said electronic tag by reader/writer means.

4. A discarded industrial product recycling system according to claim 3,
   wherein said data is read by said reader/writer means for thereby assorting selectively said discarded industrial products by deciding to which of a shredding/sorting route, a disassembling route and a reuse-destined route said discarded industrial product is to be sent on the basis of said data read from said electronic tag.

5. A discarded industrial product recycling system according to claim 4,
   comprising assorting means installed at said disposal center for sorting/classifying disassembled parts,
   said assorting means including a plurality of palettes disposed on a transferring line for receiving disassembled parts resulting from disassembling of the discarded industrial products; and
   discharge ports for allowing the component parts on said palettes to be discharged;
   wherein the data recorded in the electronic tags attached to the discarded industrial products, respectively, are read by said reader/writer means to thereby determine destinations of said palettes, respectively, on the basis of said data read from said electronic tags, respectively, for thereby allowing said disassembled parts to be sent to said discharge ports while being assorted from one another.

6. A discarded industrial product recycling system according to claim 3,
   wherein for the discarded industrial product having box-like members made of plastics, degree of deterioration, quality and color of said plastic box-like members are measured, results of which are additionally written in said electronic tag by reader/writer means.

7. A discarded industrial product recycling system according to claim 6,
   comprising assorting means installed at said disposal center for sorting/classifying disassembled parts,
   said assorting means including a plurality of palettes disposed on a transferring line for receiving disassembled parts resulting from disassembling of the discarded industrial products; and
   discharge ports for allowing the component parts on said palettes to be discharged;
   wherein the data recorded in the electronic tags attached to the discarded industrial products, respectively, are read by said reader/writer means to thereby determine destinations of said palettes, respectively, on the basis of said data read from said electronic tags, respectively, for thereby allowing said disassembled parts to be sent to said discharge ports while being assorted from one another.

8. A discarded industrial product recycling system according to claim 3,
   comprising assorting means installed at said disposal center for sorting/classifying disassembled parts,
   said assorting means including a plurality of palettes disposed on a transferring line for receiving disassembled parts resulting from disassembling of the discarded industrial products; and discharge ports for allowing the component parts on said palettes to be discharged;

wherein the data recorded in the electronic tags attached to the discarded industrial products, respectively, are read by said reader/writer means to thereby determine destinations of said palettes, respectively, on the basis of said data read from said electronic tags, respectively, for thereby allowing said disassembled parts to be sent to said discharge ports while being assorted from one another.

9. A discarded industrial product recycling system according to claim 3, wherein said electronic tag is written and attached at one of said dealer agencies, said lease agencies and said rental agencies.

10. A discarded industrial product recycling system, comprising:

a plurality of palettes;

palette-dedicated electronic tags attached to said palettes, respectively;

first reader/writer means for writing data in said palette-dedicated electronic tags;

discharge ports at which said palettes are unloaded, respectively; and second reader/writer means disposed at said discharge ports, respectively, for reading the data recorded in said palette-dedicated electronic tags, respectively;

wherein delivery-destination codes indicating the destination discharge ports are written in said palette-dedicated electronic tags, respectively, each of said palettes being carried to said discharge ports where the data recorded in said palette-dedicated electronic tags are read by said second reader/writer means, and wherein when a code of the palette-dedicated electronic tag coincides with a code of the discharge port, component parts on the palette assigned with said coincident code are discharged into said discharge port for which inter-code coincidence has been detected.

11. A system for recycling discarded industrial products, comprising:

a plurality of palettes;

electronic tags attached to said palettes, respectively;

conveyer means for carrying said palettes;

a plurality of discharge ports for receiving the palettes carried thereto by said conveyer means;

write means for writing in said electronic tag information concerning a destination discharge port of the palette to which said electronic tag is attached; and read means for reading the information concerning said destination discharge port of the palette transported by said conveyer means from the electronic tag attached to said palette to thereby send said palette selectively to the destination discharge port indicated by said destination information.

12. A method for recycling discarded industrial products comprising the steps of a process for transporting discarded industrial products discharged from individual discard sources to a disposal center, and a process for treating of said discarded industrial products at said disposal center, wherein the process for transporting includes writing in an electronic tag information required for treating each of said discarded industrial products and affixing said electronic tag to each of said discarded industrial products at a predetermined place in the course of transferring said discarded industrial products to said disposal center from said individual discard sources, and said electronic tag sending to said disposal center together with said discarded industrial product.

13. A method for recycling discarded industrial products according to claim 12, wherein the individual discard sources include at least one of an individual, a dealer agency, a lease agency and a rental agency which utilize the industrial product and discard the same and collect discarded industrial products primarily from an individual.

14. A method for recycling discarded industrial products according to claim 13, wherein the process for treating includes sending said electronic tag which is sent to said discarded industrial product disposal center as affixed to said discarded industrial product back to said predetermined place where said information is written in said electronic tag.

* * * * *